United States Patent [19]
Broaddus et al.

[11] 3,891,672
[45] June 24, 1975

[54] PROCESS FOR PREPARING R-SULTONES
[75] Inventors: Charles David Broaddus, Cincinnati; Medford Dwight Robbins, Fairfield, both of Ohio
[73] Assignee: Procter & Gamble Company, Cincinnati, Ohio
[22] Filed: Sept. 26, 1972
[21] Appl. No.: 292,354

[52] U.S. Cl. ............................................. 260/327 S
[51] Int. Cl. ............................................. C07d 89/06
[58] Field of Search ................................ 260/327 S

[56] References Cited
UNITED STATES PATENTS

| | | | |
|---|---|---|---|
| 3,164,608 | 1/1965 | Blaser | 260/327 |
| 3,164,609 | 1/1965 | Voss | 260/327 |
| 3,255,240 | 6/1966 | Wolfram et al. | 260/327 S |
| 3,376,336 | 4/1968 | Stein | 260/513 |
| 3,409,637 | 11/1968 | Eccles | 260/327 |
| 3,424,693 | 1/1969 | Stein | 252/355 |
| 3,424,694 | 1/1969 | Stein | 252/355 |
| 3,428,654 | 2/1969 | Rubinfeld | 260/327 |

OTHER PUBLICATIONS

Barnett et al., Inorganic Chemistry (Longmans Green, London, 1953), pp. 430–431.

Primary Examiner—Henry R. Jiles
Assistant Examiner—C. M. S. Jaisle
Attorney, Agent, or Firm—William Keith Turner; John B. Goodman; Jerry J. Yetter

[57] ABSTRACT

γ-Sultones are prepared by an all-gas phase reaction employing cracked, monomolecular sulphur trioxide diluted with an inert gas and a gaseous olefin which is also diluted with an inert gas. The reactants are admixed in the gas phase and the reaction occurs spontaneously. The sultone reaction products are useful as intermediates in the preparation of surfactants.

7 Claims, No Drawings

PROCESS FOR PREPARING R-SULTONES

BACKGROUND OF THE INVENTION

The instant invention is an improved process for preparing γ-sultones in high yields, at high reactant ratios, and without substantial product charring. More particularly, the invention relates to a process for preparing sultones by admixing diluted, gaseous, monomolecular sulphur trioxide and a diluted, gaseous olefin in the all-gas phase and recovering the sultone reaction product.

The γ-sultone compounds prepared in the manner of the instant invention have a variety of uses, e.g., as organic solvents and in the preparation of surfactants and the like. For example, the sultones herein can be reacted with tertiary amines in the manner disclosed in U.S. Pat. No. 3,594,411 to prepare sulfobetaines useful in detergent compositions, lubricants, and cosmetics.

The preparation of sultones from gaseous or liquid sulphur trioxide and liquid olefins is described in U.S. Pat. Nos. 3,164,608 and 3,164,609. The processes of the foregoing patents are not carried out in the all-gas phase and product yields are in the range of only about 30 percent to about 40 percent.

U.S. Pat. No. 3,255,240 also relates to the preparation of sultones using gaseous or liquid olefins and gaseous sulphur trioxide. The sulphur trioxide is pre-cracked and diluted with an inert gas prior to admixture with the olefin. The $SO_3$:olefin ratio in this process must be 10 mole precent, or less, based on olefin; accordingly, while operative for its purpose, the efficiency of this process is substantially less than optimal.

By the present invention it has been found that γ-sultones can be prepared in 80 to 90 percent yields and at nearly stoichiometric reactant ratios, i.e., at high reaction efficiencies, by employing gaseous, pre-cracked sulphur trioxide which is in substantially the monomolecular state and an olefin which is in the gas phase either by virtue of its molecular weight or by virtue of the reaction temperatures employed. Surprisingly, it has been found that by diluting both the monomolecular sulphur trioxide and the gaseous olefin with an inert gas prior to their admixture in the gas phase, product charring is minimized and high reactant ratios can be employed.

Accordingly, it is an object of this invention to provide an improved process for preparing γ-sultones from olefins and sulphur trioxide. It is a further object herein to provide an all-gas phase process for preparing sultones in high yields, at high reaction efficiencies, and without substantial product charring. These and other objects are obtained by this invention as will be seen from the following disclosure.

SUMMARY OF THE INVENTION

The present invention is a process for preparing γ-sultones comprising admixing a gaseous mixture of cracked, substantially monomolecular, sulphur trioxide diluted with an inert gas with a gaseous mixture of an olefin as disclosed hereinafter diluted with an inert gas. In a preferred mode, vaporized, polymeric sulphur trioxide is admixed with an inert gas at a volume ratio of sulphur trioxide to inert gas of from about 1:1 to about 1:10 and the sulphur trioxide is then cracked at a temperature of from about 100°C to about 150°C. The gaseous mixture of inert gas and monomolecular sulphur trioxide is then admixed with a gaseous mixture comprising an olefin and an inert gas at a volume ratio of olefin to inert gas of from about 1:1 to about 1:10. The monomolecular sulphur trioxide reacts spontaneously with the gaseous olefin to provide the desired sultone reaction product. The reaction herein can be carried out at mole ratios of the monomolecular $SO_3$-to-olefin as high as about 1:2, preferably 1:2 to about 1:10. When operating in the higher ratios within the range, i.e., about 1:2 to about 1:5, the efficiency of the reaction is satisfactory for industrial scale processes. Of course, reactant ratios lower than about 1:10 can be employed in the process herein but the reaction efficiency is low and extensive recycling of unreacted olefin is necessary. It is therefore preferred herein to employ mole ratios of monomolecular $SO_3$-to-gaseous olefin of about 1:2.

Product charring is an art recognized problem encountered when sulphur trioxide is reacted with olefins. In the present process, the all-gas phase reaction conditions and the dilution of both the cracked sulphur trioxide and the olefin with inert gases to a great extent overcomes this charring problem. It has additionally been found that impinging a stream of refrigerant gas on the sultone reaction product prepared in the manner of this invention immediately after its formation still further reduces charring. Accordingly, a preferred mode of the present invention comprises, as an additional step, impinging a stream of refrigerant gas on the sultone reaction product immediately after its formation.

DETAILED DESCRIPTION OF THE INVENTION

The instant invention employs monomolecular sulphur trioxide, a gaseous olefin, an inert gas, and in a preferred mode, a refrigerant gas, to prepare γ-sultones according to the following reaction:

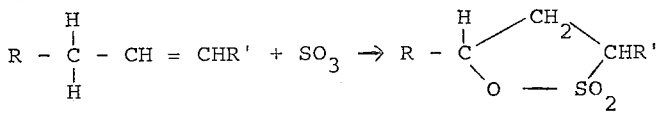

wherein R is a linear or branched chain alkyl group containing 1 to about 20 carbon atoms or an aralkyl group, e.g., benzyl, and wherein R is hydrogen or a linear or branched chain alkyl group containing 1 to about 20 carbon atoms. Preferably, the olefins employed herein are those wherein R' is hydrogen, i.e., α-olefins. α-Olefins containing 4 to about 6 carbon atoms, i.e., wherein R is methyl, ethyl or propyl and wherein R' is hydrogen, are perferred for use herein. 1-Butene is especially preferred for use in the instant process inasmuch as its reaction product, 1,3-butanesultone, is especially useful in the preparation of surfactants.

As noted by the foregoing equation, any olefin having a linear chain of at least 4 carbon atoms, either of the α-olefin type or internal olefin type, can be used in the process of the present invention to provide γ-sultones. Lower molecular weight olefins within this group are gases at room temperature and can be introduced into the reaction in the gaseous state at ambient temperatures. Higher molecular weight olefins are liquids or semi-solids at room temperature and can be vaporized, for example by heating, prior to use in the process herein. Non-limiting examples of olefins useful in the present process include: 1-butene (preferred), 1-pentene, 1-hexene, 1-octene, 1-decene, 1-dodecene, 1-tetradecene, 1-pentadecene, 1-hexadecene, 1-octadecene, 1-eicosene, 1-docosene, 2-butene, 2-pentene, 2-decene, 2-octadecene, 2-eicosene, 3-hexene, 3-docosene, 1,3-bis-(eicosyl)-1-propene, 3-benzyl-1-propene, and 3-p-tolyl-1-butene. The foregoing olefins are commerically available. As described hereinafter, the olefins are diluted with an inert gas prior to admixture with the monomolecular $SO_3$.

The sulphur trioxide employed in the instant process is the commerical material which is pre-cracked immediately prior to use so that it is in the substantially monomolecular state at the time of reaction. As is well-known, sulphur trioxide exists as a polymer; however, this polymer can be cracked to single molecules of $SO_3$ by heating at a temperature of from about 100°C to about 150°C. In the monomolecular state, the sulphur trioxide is in the gaseous form and is highly reactive. In the process of this invention, the polymerized, commerical sulphur trioxide is vaporized at a temperature of about 65°C and then thermally cracked, e.g., by passage through a hot tube at a temperature of from about 100°C to about 150°C. The monomolecular $SO_3$ can then be admixed with an inert gas and brought in contact with the diluted olefin to afford the desired sultone products.

Gaseous, monomolecular $SO_3$ is extremely reactive and tends to polymerize. For this reason, it is preferred herein to vaporize the sulphur trioxide and admix the vapors with the inert gas prior to cracking the $SO_3$. In this manner, re-polymerization is minimized and most of the difficulties in handling monomolecular $SO_3$ are obviated. For most purposes, a volume ratio of $SO_3$:inert gas of from about 1:1 to about 1:10 is suitable to dilute the $SO_3$, but lower ratios can be employed.

The inert gas used to dilute both the monomolecular $SO_3$ and the gaseous olefin employed in the present process prior to their admixture can be any gaseous material which does not react with monomolecular $SO_3$, or with the olefin being reacted, or with the sultone reaction product. Exemplary inert gases herein include the rare gases, i.e., helium, argon, xenon, and neon, as well as nitrogen. Gaseous fluorinated and chlorofluorinated hydrocarbons, e.g., chlorotrifluoromethane and tetrafluoromethane, can also be used as the inert diluent gas herein. The nature of the reaction product and reaction yields in no way depend on the nature of the inert gas employed to dilute the monomolecular $SO_3$ and olefin; however, nitrogen is the preferred diluent gas herein because of its low cost and ready availability.

The inert diluent gas is admixed with the gaseous olefin at a volume ratio of olefin to inert gas of from about 1:1 to about 1:10. Likewise, the diluent gas is admixed with the monomolecular $SO_3$ at a volume ratio of monomolecular $SO_3$-to-inert gas of from about 1:1 to about 1:10. The mixture of inert gas and olefin and the mixture of inert gas and monomolecular $SO_3$ are then admixed as described hereinafter to provide the sultone reaction product.

The heat of reaction evolved on admixing the highly reactive, monomolecular sulphur trioxide and olefin is sufficient to cause charring of the sultone reaction product. Dilution of the $SO_3$ and olefin reactants with the inert gas as described above substantially reduces product charring. Another way to reduce charring is to use lower molar ratios of monomolecular $SO_3$-to-olefin, thereby having excess olefin present as a diluent, and thus decreasing the rate of reaction. However, when this technique is employed, the reaction efficiency decreases as the $SO_3$-to-olefin ratio departs from the ideal 1:1 reaction stoichiometry and extensive olefin recycling must be employed to prevent economic loss. It has now been found that by impinging a stream of a refrigerant gas on the sultone reaction product immediately after its formation the excessive heat generated by the reaction can be quickly dissipated and product charring virtually eliminated. Thus, a preferred mode of this invention employs the combined technique of diluting both the monomolecular $SO_3$ and the gaseous olefin with an inert gas prior to reaction, and impinging a stream of refrigerant gas on the sultone reaction product immediately following its formation to eliminate product charring. At the same time, cooling the sultone product with the refrigerant gas allows for high ratios of monumolecular $SO_3$-to-olefin to be employed, thereby greatly increasing the efficiency and throughput of the process.

Exemplary refrigerant gases which can be employed in the present process include those inert halogenated gaseous materials sold under the tradename "Freon," available from E. I. duPont de Nemours, Inc. Such materials include the fluorinated and chlorofluorinated derivatives of methane, ethane, propane and butane. Exemplary chlorofluorinated refrigerant gases useful herein include trichlorofluoromethane, dichlorodifluoromethane, 1,2-dichloro-1,1,2,2-tetrafluoroethane, and octafluorocyclobutane. Other materials useful as the refrigerant gas herein include low boiling, inert, saturated hydrocarbons, such as butane, pentane and hexane. A preferred refrigerant gas suitable for use herein for cooling the sultone reaction product is dichlorodifluoromethane. Refrigerant gases which are preferred by virtue of their low cost and ready availability are vaporized pentane and vaporized hexane.

The process herein is carried out by admixing a stream of cracked, monomolecular sulphur trioxide diluted with an inert gas with a stream of olefin diluted with an inert gas in any suitable, enclosed mixing chamber. The reactants can be admitted into the chamber at room temperature or can be heated or cooled prior to admixture. The temperature on mixing is not critical, other than that it must be above the vaporization temperatures of both the monomolecular sulphur trioxide and the olefin in order for the reaction to be carried out in the gas phase. The reaction occurs spontaneously on admixture of the two gas streams.

When a refrigerant gas is employed to cool the sultone reaction products formed on admixture of the olefin and sulphur trioxide gas streams, the mixing chamber can be fitted with an additional inlet for said refrigerant gas which can be directed to impinge on the solid reaction products.

A preferred method for admixing the diluted, monomolecular sulphur trioxide and diluted olefin herein employs a pneumatic atomizing nozzle of the type well known in the art. When such nozzles are employed herein, the diluted olefin can be sprayed through one orifice of the nozzle while the diluted, monomolecular sulphur trioxide is being sprayed through the other orifices. The gas streams admix and react spontaneously as they proceed in a direction away from the nozzle.

Surprisingly, it has been found that when the diluted olefin is passed through the center orifice of a pneumatic atomizing nozzle and the diluted, cracked sulphur trioxide is passed through the outer orifices of the atomizing nozzle, improved yields of sultone products are secured over that when the reverse configuration is employed. Accordingly, a preferred mode of the instant invention comprises admixing the diluted, monomolecular $SO_3$ and diluted olefin by passing a gaseous mixture comprising an olefin and an inert gas as hereinabove described through the central orifices of a pneumatic atomizing nozzle while concurrently passing a mixture comprising monomolecular, gaseous sulphur trioxide and an inert gas, through the outer orifices of said atomizing nozzle to provide a γ-sultone reaction product. A stream of refrigerant gas can be directed on the sultone reaction products to eliminate charring.

Any of the olefins and inert gases hereinabove disclosed are suitable for use when standard pneumatic atomizing nozzles are employed to admix the monomolecular sulphur trioxide and gaseous olefin herein.

The following examples are intended to illustrate the present invention but are not intended to be limiting thereof. All materials and apparatus employed in the examples are commerically available.

EXAMPLE I

Preparation of 1,3-Butanesultone

1-Butene (99.0 percent) at a flow rate of 200 cc/minute was mixed with nitrogen flowing at a rate of 250 cc/minute in a Y tube and sprayed through the center orifice of a pneumatic atomizing nozzle. The 1-butene comprised 45 percent of the gas stream on a volume basis. Approximately four moles of 1-butene were passed through the apparatus during the reaction.

Eighty ml. of sulphur trioxide (160 g., 2 moles) was vaporized at 55°C–60°C in a stream of nitrogen at 250 cc/minute. Based on a time average, the gas stream contained about 30 percent (volume) $SO_3$; the stream was passed through an open 9 inch × ½ inch cylindrical, vertical glass tube heated to 100°C to prevent condensation of monomeric sulphur trioxide and to "crack" any polymeric species present. The stream comprising nitrogen and the cracked $SO_3$ was passed through the outer orifices of the atomizing nozzle concurrently with passage of the butene-nitrogen mixture through the center orifice. The mole ratio of 1-butene to sulphur trioxide was 2:1. The spray was directed downward through a condenser and a series of condenser traps immersed in ice water. A white fog filled the apparatus, and a white, viscous material condensed. The viscous material was recovered and placed in vacuo to remove entrained gasses. The residue, which was 1,3-butanesultone, weighed 242 g. (90 percent conversion). The crude 1,3-butanesultone was distilled and yielded 174 g (64 percent) of the pure product; b.p. 125°C, 0.5 mm Hg.

In the above procedure, the nitrogen gas is replaced by an equivalent amount of helium and argon, respectively, and equivalent results are secured in that 1,3-butanesultone is prepared in ca. 90 percent yields.

In the above procedure, the 1-butene is replaced by an equivalent amount of vaporized 4-phenyl-1-butene, vaporized 1-pentene, vaporized 1-hexadecene, vaporized 2-octadecene and vaporized 3-eicosene, respectively, and the following sultones are thereby secured, respectively: 4-phenyl-1,3-butanesultone, 1,3-pentanesultone, 1,3-hexadecanesultone, 2,4-octadecanesultone and 3,5-eicosanesultone.

In the above procedure, the sulphur trioxide is vaporized at 65°C and cracked by passage through a hot tube at 150°C prior to admixture with the nitrogen diluent gas and equivalent results are secured.

In the above procedure, a stream of vaporized dichlorodifluoromethane, vaporized pentane and vaporized hexane, respectively, are directed onto the sultone reaction product immediately after its formation. The sultone product is rapidly chilled by the gas and charring is essentially eliminated.

EXAMPLE II

1-Butene at a flow rate of 100 cc/minute is mixed with argon flowing at a rate of 300 cc/minute in a Y tube. The mixture of 1-butene and argon is then directed into a glasslined mixing chamber at a flow rate of about 400 cc/minute.

Liquid sulphur trioxide is vaporized at a temperature of 60°C into a stream of nitrogen gas flowing at 250 cc/minute. The sulphur trioxide is cracked in the presence of the nitrogen gas by passage over a heating element at 150°C. The stream of nitrogen and cracked sulphur trioxide is directed into the mixing chamber containing the 1-butene and argon mixture at a flow rate of 200 cc/minute. The input of $SO_3$ into the nitrogen stream is adjusted to provide mole ratio of cracked, monomolecular $SO_3$-to-1-butene in the reaction chamber of about 1:3, on a time average basis. The reaction product, 1,3-butanesultone, forms spontaneously on admixture of the monomolecular sulphur trioxide and 1-butene.

The solid reaction product is removed from the walls of the chamber by scraping and distilled in vacuo to yield pure 1,3-butanesultone; yields are greater than about 60 percent of the pure, distilled product. Unreacted 1-butene is recycled for repassage through the mixing chamber and reaction with the sulphur trioxide.

What is claimed is:

1. A process for preparing γ-sultones comprising admixing a gaseous mixture comprising monomolecular $SO_3$ and an inert gas with a gaseous mixture comprising an olefin having at least a four carbon atom chain and an inert gas at a temperature of from about 100°C to about 150°C the ratio of a monomolecular $SO_3$-to-olefin being about 1:2.

2. A process according to claim 1 wherein the olefin is 1-butene, the inert gas is nitrogen, and the ratio of monomolecular $SO_3$ to 1-butene is 1:2.

3. A process according to claim 1 wherein a stream of refrigerant gas is directed onto the γ-sultone immediately after its formation.

4. A process to claim 3 wherein the refrigerant gas is a member selected from the group consisting of dichlorodifluoromethane, pentane and hexane.

5. A process for preparing γ-sultones, comprising the steps of:
   a. heating a mixture comprising $SO_3$ and an inert gas at a temperature of from about 100°C to about 150°C to provide monomolecular $SO_3$; and
   b. passing the mixture of inert gas and monomolecular $SO_3$ prepared in step (a) through the outer orifices of a pneumatic atomizing nozzle while concurrently passing a mixture comprising an olefin and an inert gas through the central orifices of said atomizing nozzle to admix said monomolecular $SO_3$ and said olefin.

6. A process according to claim 5 wherein the olefin is 1-butene, whereby 1,3-butanesultone is formed.

7. A process according to claim 6 wherein a stream of refrigerant gas is directed onto the 1,3-butanesultone immediately after its formation.

* * * * *